United States Patent
Lu

(10) Patent No.: US 10,515,275 B2
(45) Date of Patent: Dec. 24, 2019

(54) INTELLIGENT DIGITAL IMAGE SCENE DETECTION

(71) Applicant: Adobe Inc., San Jose, CA (US)

(72) Inventor: Xin Lu, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/816,704

(22) Filed: Nov. 17, 2017

(65) Prior Publication Data

US 2019/0156122 A1    May 23, 2019

(51) Int. Cl.
| | |
|---|---|
| G06K 9/00 | (2006.01) |
| G06K 9/48 | (2006.01) |
| G06K 9/62 | (2006.01) |
| G06F 16/56 | (2019.01) |
| G06F 16/583 | (2019.01) |
| G06F 16/58 | (2019.01) |

(52) U.S. Cl.
CPC ......... *G06K 9/00684* (2013.01); *G06F 16/56* (2019.01); *G06F 16/5838* (2019.01); *G06F 16/5866* (2019.01); *G06K 9/481* (2013.01); *G06K 9/6215* (2013.01); *G06K 9/6277* (2013.01)

(58) Field of Classification Search
None
See application file for complete search history.

(56) References Cited

U.S. PATENT DOCUMENTS

| | | | |
|---|---|---|---|
| 2012/0054658 A1* | 3/2012 | Chuat | G06F 16/583 |
| | | | 715/771 |
| 2018/0032845 A1* | 2/2018 | Polak | G06K 9/6269 |
| 2019/0005358 A1* | 1/2019 | Pisoni | G06K 9/6267 |

OTHER PUBLICATIONS

Espinace, Pablo, Thomas Kollar, Alvaro Soto, and Nicholas Roy. "Indoor scene recognition through object detection." In 2010 IEEE International Conference on Robotics and Automation, pp. 1406-1413. IEEE, 2010. (Year: 2010).*

* cited by examiner

*Primary Examiner* — David Perlman
(74) *Attorney, Agent, or Firm* — Keller Jolley Preece

(57) ABSTRACT

The present disclosure includes systems, methods, and computer readable media, that identify one or more scene categories that correspond to digital images. In one or more embodiments, disclosed systems analyze a digital image to determine, for each of a plurality of object tags, a probability that the object tag associates with the digital image. The systems further determine, for each of the plurality of object tags, a similarity score for each of a plurality of scene categories (e.g., a similarity between each object tag and each scene category). Using the object tag probabilities and the similarity scores, the disclosed systems determine a probability, for each scene category, that the digital image pertains to the scene category. Based on the determined probabilities, the disclosed systems are able to identify an appropriate scene category for the digital image.

20 Claims, 10 Drawing Sheets

INTELLIGENT DIGITAL IMAGE SCENE DETECTION

BACKGROUND

With advances in camera technology and the rise of camera-enabled mobile devices, users are capturing more digital images than ever. In fact, it is not uncommon for users to have tens, if not hundreds, of gigabytes of digital images stored on their computing devices and/or in the cloud. Because of the vast quantity of digital images, it is near impossible for users to manually sort and classify images. Accordingly, computing systems are required to analyze, classify, organize, and manage digital images in a way that makes it easy for users to find digital images in an efficient manner. For example, conventional systems utilize facial recognition and object detection to analyze an image and identify the people and/or objects portrayed within the image. The systems can then categorize and/or search for images to provide to a user (e.g., in response to a search query), thus making a collection of digital images more manageable and useful for the user.

However, conventional processes and systems for analyzing and classifying digital images require an enormous amount of processing power and other computational resources. In particular, conventional systems typically require a collection of server devices dedicated to the process of analyzing digital images in order to detect objects/faces within the digital images, and then to classify and index the digital images accordingly. Because of these computational requirements, client devices (e.g., mobile devices) are often unable to adequately perform digital image analysis.

Thus, there are disadvantages with regard to conventional digital image analysis systems.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems analyze a digital image to determine, for each of a plurality of object tags, a probability that the object tag associates with the digital image. The systems further determine, for each of the plurality of object tags, a similarity score for each of a plurality of scene categories (e.g., a similarity between each object tag and each scene category). Using the object tag probabilities and the similarity scores, the disclosed systems determine a probability, for each scene category, that the digital image pertains to the scene category. Based on the determined probabilities, the disclosed systems are able to identify an appropriate scene category for the digital image.

The disclosed systems, methods, and non-transitory computer-readable media therefore enjoy several advantages over conventional digital image analysis systems. For example, the systems described herein can recognize a wide range of objects within a digital image, and leverage the analysis of each object to determine a scene category for the digital image. Indeed, the systems can identify a scene category for a digital image and classify the image accordingly in an open-ended and unconstrained manner.

Furthermore, the disclosed systems are able to analyze and classify digital images in a way that requires significantly less computational resources than conventional systems. Indeed, in some embodiments, the disclosed systems can be implemented on client devices, previously unable to handle the computational workload typically necessary to analyze and classify digital images.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
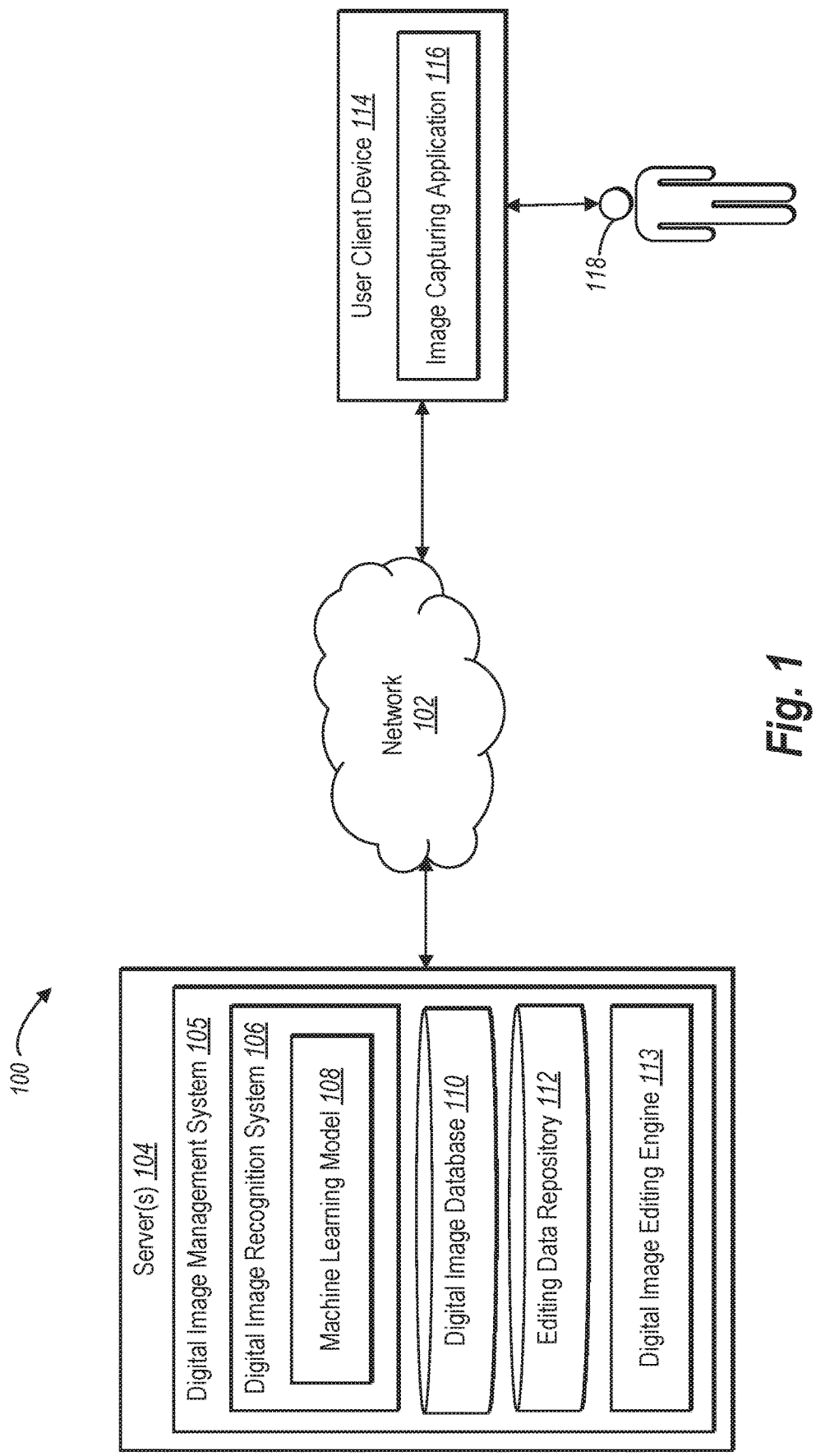
FIG. 1 illustrates a schematic diagram of an example environment of a digital image recognition system in accordance with one or more embodiments.

One or more embodiments described herein provide benefits and solve one or more of the foregoing or other problems in the art with a digital image recognition system that recognizes a scene depicted within a digital image by using a computationally efficient machine learning probability model. In particular, the digital image recognition system described herein categorizes a digital image based on a scene depicted in the digital image.

To recognize a scene depicted within a digital image, the digital image recognition system analyzes the digital image to identify objects within the digital image. For instance, in one or more embodiments, the digital image recognition system determines, for each of a plurality of object tags, a probability that the object tag associates with (or pertains to) the digital image. Further, the digital image recognition system determines a similarity score between each of the plurality of object tags and each of a plurality of scene categories. Using the determined similarity scores and the determined probabilities that each object tag associates with the digital image, the digital image recognition system determines a probability that the digital image belongs to each scene category. The digital image recognition system further identifies a designated scene category to which the digital image belongs based on the determined probabilities for each respective scene category.

As mentioned, the digital image recognition system analyzes a digital image to identify objects within the digital image. In particular, the digital image recognition system analyzes a digital image captured by a user client device using a camera associated with the user client device. The digital image recognition system analyzes the digital image to determine, for each of a plurality of object tags, a probability that the object tag associates with the digital image. For instance, in some embodiments, the digital image recognition system implements a trained machine learning model to analyze the digital image and generate the object tag probabilities.

In addition to determining probabilities associated with the object tags, the digital image recognition system determines similarities between the object tags and various scene categories. For instance, in some embodiments, the digital image recognition system generates a feature vector that represents an object tag and generates a feature vector that represents a scene category. The digital image recognition system further compares the two feature vectors to generate a similarity score indicating a similarity between the object tag and the scene category. The digital image recognition system then repeats this process to determine similarity scores for each object tag/scene category pair.

Using the determined similarity scores, the digital image recognition system determines a probability that each scene category pertains to the digital image. In particular, the digital image recognition system determines a probability that the digital image belongs to a given scene category based on the similarity scores between the scene category and each object tag, and based on the determined probabilities that each object tag associates with the digital image. By repeating this process for a plurality of potential scene categories, the digital image recognition system determines probabilities that the digital image belongs to each of the potential scene categories.

Upon determining the probabilities that a digital image belongs to each of a plurality of scene categories, the digital image recognition system is able to classify the digital image. For instance, in some embodiments, the digital image recognition system compares the probabilities to each other to identify the highest probability and corresponding scene category. In another example, the digital image recognition system compares the probabilities to a threshold value to determine which probabilities satisfy the threshold. In any case, the digital image recognition system uses the probabilities to identify a designated scene category, to which the digital image belongs.

Upon classifying the digital image into a designated scene category, the digital image recognition system further generates a set of image editing tools optimized for the scene category to which the digital image belongs (i.e., the designated scene category). For example, the digital image recognition system generates a set of image editing tools based on a determination of those editing tools that are best suited for the particular scene category. To illustrate, the digital image recognition system might determine that tools for editing hue and saturation are more suited for digital images of food, whereas tools for editing skin smoothing and lighting angles are more suited for digital images of faces (e.g., portraits, selfies, etc.). In some embodiments, the digital image recognition system utilizes a repository of digital image editing data to determine those editing tools that are best suited for a given scene category (e.g., based on editing tools that previous users have used to edit digital images in a particular scene category).

The digital image recognition system described herein provides a number of advantages over conventional digital image analysis systems. For example, the digital image recognition system is more adaptive and flexible than many conventional digital image analysis systems. To illustrate, the digital image recognition system is able to recognize image features across a wide range of images, rather than only recognizing faces or other specific objects for which a conventional system is specifically designed. In addition, the digital image recognition system is more flexible than conventional systems because the digital image recognition system can learn new image features from training data (e.g., images from a digital image database) and adjust to identify these new image features upon retraining the machine learning model.

Furthermore, the digital image recognition system described herein is also faster and requires less computational resources than conventional systems. For example, the digital image recognition system requires less time and processing power to analyze and classify a digital image than many conventional systems. Because of its faster, less resource-intensive nature, the digital image recognition system described herein is more suitable for mobile devices, which have less processing capability than other non-mobile systems (e.g., backend/cloud-based systems). Accordingly, users are no longer required to upload images to a separate service, nor are they required to wait the period of time typically required to analyze and classify a newly-captured digital image.

Furthermore, the digital image recognition system can quickly generate and provide a set of image editing tools to a user client device (e.g., once a user takes a photo with a smartphone). Because the digital image recognition system is faster than conventional systems that utilize conventional image analysis techniques, the digital image recognition system can also provide optimized image editing tools in near real time (e.g., shortly after a digital image is captured). While some conventional systems require a significant amount of time for users to peruse through editing options, the digital image recognition system described herein quickly provides a simple selection of editing tools that are optimized for a particular digital image based on the scene category of the digital image.

Additional detail regarding the digital image recognition system is provided below. Throughout the description of the digital image recognition system, various terminology will be used to describe the systems, methods, and computer readable media associated with the digital image recognition system. Accordingly, hereafter is provided a number of definitions of terms that relate to the digital image recognition system and the disclosure provided herein.

As used herein, the term "digital image" refers to a digital representation of an image captured by a camera device. For example, a digital image may refer to a digital photograph captured using a mobile device with an integrated digital camera. A digital image may also refer to an image stored in a digital database accessible by a user client device and/or a server. Furthermore, a digital image may portray a scene including one or more objects (e.g., people, vegetation, animals, food, or other objects).

As mentioned, a digital image may include one or more objects. As used herein, the term "object" refers to an item portrayed within a digital image as represented by a grouping of pixels within the digital image. Indeed, an object may be represented by a grouping of pixels that form a distinct shape or color within a digital image. An object may include pixels that have similar characteristics such as color values (e.g., red green blue or "RGB" values), hue saturation lightness ("HSL") values, hue saturation value ("HSV") values, etc. For instance, an object may refer to a grouping whose pixels are all within a threshold similarity of each other. In addition, an object may refer to a grouping of pixels that exceeds a contrast threshold compared to surrounding pixels. Example objects may include a portion of a human body, a face, a sky, a sun, a building, a tree, a mountain, a piece of fruit, a plate of food, a chair, a ball, a light post, an animal, etc.

As mentioned, a user may capture a digital image by way of a user client device. As used herein, the term "user client device" refers to a computing device associated with user. In particular, a user client device can refer to a computing device capable of capturing and/or storing digital images. A user device can include a camera and can further include a display screen capable of displaying or presenting digital content such as a digital image. For instance, a user client device can include a mobile device such as a smartphone, a tablet, or a wearable device. A user client device can be associated with a user who operates the user client device to capture, edit, and/or otherwise manage digital images.

As used herein, the term "user" refers to an individual, group of individuals, company, or other entity who operates a user client device. In particular, a user may refer to an individual who operates the user client device to capture, edit, or otherwise manage a digital image.

As will be described in further detail below, the digital image recognition system may categorize a digital image into a particular scene category. As used herein, the term "scene category" refers to a classification or type of scene commonly depicted within digital images. In particular, a scene category may refer to a category for images including a particular combination, organization, and/or presentation of objects. Indeed, as described in further detail below, the digital image recognition system can categorize a digital image into a scene category based on the objects identified within the digital image. Example scene categories include the following: a self-photograph ("selfie") scene, a group selfie scene, a food scene, a close-up scene, a portrait scene, a beach scene, a forest scene, a mountain scene, a city scene, a desert scene, a water scene, an office scene, a home scene, a nighttime scene, a wildlife scene, or a car scene. While this definition includes a particular listing of scene categories, additional or alternative scene categories are also possible.

To categorize a digital image into a scene category, the digital image recognition system may utilize object tags for objects within the digital image. As used herein, the term "object tag" (or sometimes simply "tag") refers to an identifier associated with an object within a digital image. In particular, an object tag may refer to a label or description of a particular object. More particularly, an object tag may be a text string including one or more words that describe an object. For an object within a digital image that looks like a tree, for example, the corresponding object tag may be "tree." Likewise, for another object that looks like a face, the object tag may be "face," or may be a name (e.g., a username, profile name, etc.) or other identifier associated with the individual who's face is included in the image. Indeed, each object identified within a digital image may have a corresponding object tag or multiple object tags that identify, describe, or provide information associated with the object.

The digital image recognition system may implement a machine learning model to accomplish one or more of the functionalities described herein. As used herein, the term "machine learning model" refers to a computational model that can be tuned (e.g., trained) based on inputs to approximate unknown functions. In particular, the term machine-learning model can include a model that uses machine learning algorithms to learn to approximate complex functions and generate outputs based on a plurality of inputs (e.g., a training dataset including a plurality of digital images classified into scene categories). As used herein, a machine-learning model can include, but is not limited to, a neural network (e.g., a convolutional neural network or deep learning), decision tree, association rule learning, inductive logic programming, support vector learning, Bayesian network, regression-based model, principal component analysis, or a combination thereof.

As will be described in further detail below, the digital image recognition system may utilize one or more features vectors to generate, for example, a similarity score between an object tag and a scene category. As used herein, the term "feature vector" refers to a vector of numerical values representing characteristics of, for example, an object tag or a scene category. A feature vector defines a position in the space, such that similar feature vectors (e.g., features vectors representing similar object tags) are located in close proximity within the space. In some embodiments, the digital image recognition system generates a feature vector by using a word to vector algorithm. For example, a word to vector algorithm can take as training input a training repository of text and map each word to a high-dimensional space. Specifically, the word to vector algorithm assigns each word in the training repository of text to a corresponding vector in the high-dimensional space. The word to vector algorithm positions the word vectors in the space such that words with similar linguistic context/meaning are located in close proximity within the space. Accordingly, a word to vector algorithm can generate vectors that reflect linguistic meaning of one or more input terms. The digital image recognition system can utilize any variety of word to vector algorithms. To illustrate, the digital image recognition system can utilize the word to vector algorithm, "Word2vec" as described in Mikolov, Tomas; Sutskever, Ilya; Chen, Kai; Corrado, Greg S.; Dean, Jeff (2013). Distributed representations of words and phrases and their compositionality, NIPS 2013, the entire contents of which are hereby incorporated by reference.

The digital image recognition system may determine a similarity between two or more feature vectors. As used herein, the term "similarity" or "similarity score" refers to a numerical representation of a closeness of two feature vectors. For example, a similarity score may represent the relative distance between two feature vectors in $n^{th}$-dimensional space. In some embodiments, the digital image recognition system determines a similarity between, for example, an object tag and a scene category by comparing a feature vector for the object tag to a feature vector for the scene category, as discussed in more detail below.

More detail regarding the digital image recognition system will now be provided with reference to the figures. For example, FIG. 1 illustrates a schematic diagram of an example environment 100 for implementing a digital image recognition system 106 in accordance with one or more embodiments. An overview of the environment 100 is described in relation to FIG. 1. Thereafter, a more detailed description of the components and processes of the digital image recognition system 106 is provided in relation to the subsequent figures.

As mentioned, FIG. 1 illustrates the environment 100 including a network 102, server(s) 104, and a user client device 114 associated with a user 118. The server(s) 104 further includes a digital image management system 105. The digital image management system 105 can receive, transmit, manage, capture, edit, or otherwise manipulate or interact with one or more digital images. In addition, while FIG. 1 illustrates the digital management system 105 located on the server(s) 104, in some embodiments the digital image management system 105 (and the components therein) is located on the user client device 114 or is distributed across the server(s) 104 and the user client device 114.

As shown, the digital image management system 105 can include the digital image recognition system 106, a digital image database 110, an editing data repository 112, and a digital image editing engine 113. The digital image recognition system 106 can further include a machine learning model 108. However, while FIG. 1 illustrates the machine learning model 108 located within the digital image recognition system 106, in some embodiments, the machine learning model 108, or copies thereof, may be housed separately or externally from the digital image recognition system 106. For example, the machine learning model 108 may be located on the server(s) 104 and/or user client device 114. On the topic of the user client device 114, the user client device 114 further includes an image capturing application 116 as shown.

Each of the components of the environment 100 can communicate with via the network 102. In particular, the network 102 can interface the server(s) 104 and the user client device 114. Accordingly, the network 102 can facilitate communications between the server(s) 104 and the user client device 114 via appropriate network protocol. For example, the network 102 may refer to a local network (e.g., a local area network or "LAN"), a wide area network ("WAN"), an Internet communication network, a cellular network, a 3G or 4G network, or else may refer to different communication protocol by which two computing devices can communicate. Example networks are discussed in more detail below with reference to FIG. 10.

As illustrated in FIG. 1, the environment 100 includes server(s) 104. The server(s) 104 may refer to one or more computing devices that can interface with the user client device 114 and can analyze digital images. In addition, the server(s) 104 include (e.g., house) the digital image recognition system 106. The digital image recognition system 106 may be implemented by and/or installed on the server(s) 104 as hardware, software, or both. The server(s) 104 may also house a machine learning model 108 as part of or separate from the digital image recognition system 106. The machine learning model 108, like the digital image recognition system 106, may be implemented by the server(s) 104 and/or by the digital image recognition system 106 as hardware, software, or both. In addition, the machine learning model 108 may include one or more of a variety of machine learning models as described above. Furthermore, while FIG. 1 illustrates that the machine learning model 108 is housed on the server(s) 104, in some embodiments the machine learning model 108 may be located externally from the server(s) 104 and may be maintained by a third party.

Furthermore, while FIG. 1 illustrates the digital image recognition system 106 located on the server(s) 104, in some embodiments the digital image recognition system 106 is implemented on the user client device 114. For example, the digital image recognition system 106 may be implemented as part of the image capturing application 116. In still other embodiments, the digital image recognition system 106 may be implemented partly on the server(s) 104 and partly on the user client device 114.

Additionally, as shown in FIG. 1, the server(s) 104 may include, manage, and/or maintain a digital image database 110 and an editing data repository 112 (e.g., within the digital image management system 105 or otherwise). Indeed, the digital image database 110 may be located on the server(s) 104 or may be external from, but maintained by, the server(s) 104. The digital image database 110 may be located on the server(s) 104 as one or more databases that store digital images and information pertaining to the stored digital images. Such information can include indications as to scene categories to which each digital image belongs as well as object tags associated with the stored digital images. The digital image information may be stored as metadata associated with the stored digital images or may be stored independently as standalone information.

Similarly, the editing data repository 112 may be located on the server(s) 104 as one or more storage locations that include information pertaining to editing actions performed by users on digital images stored within the digital image database 110. Indeed, the digital image recognition system 106 may track the editing tools that a given user (e.g., user 118) utilizes to edit a digital image, and may, upon identifying the editing tools used by users over a larger sample size of digital images, determine relationships between the editing tools and one or more of the digital image features and/or scene category associated with a digital image. Additional detail regarding determining relationships between editing tools and digital images is provided below with reference to FIG. 7.

As also shown, the digital image editing engine 113 may be located on the server(s) 104. The digital image editing engine 113 may be installed on the server(s) 104 as hardware, software, or both. In addition, the digital image editing engine 113 may manage editing digital images by identifying, providing, receiving, determining, or generating information pertaining to digital image editing tools. Additional detail regarding the digital image editing tools is provided below in relation to FIG. 7. Furthermore, while FIG. 1 illustrates the digital image editing engine 113 located on the server(s) 104, in some embodiments, the digital image editing engine 113 may be located on the user client device 114.

As just mentioned, the environment 100 includes a user client device 114. The user client device 114 is capable of communicating across network 102 to interface with the other components of the environment 100 to receive and transmit data including digital images and image editing tools. Additionally, the user client device 114 is capable of presenting, via a display, a graphical user interface ("GUI") including a depiction of a digital image. The user client device 114 is further capable of presenting a GUI that includes a digital image as well as image editing tools provided by the digital image recognition system 106.

As illustrated in FIG. 1, the user client device 114 includes an image capturing application 116. As used herein, the term "image capturing application" refers to hardware and/or software that enables a user client device (e.g., user client device 114) to capture, edit, store, share, or otherwise manage digital images. An image capturing application may refer to a webpage, a mobile application, a software program, executable hardware instructions, or a combination thereof. In some embodiments, the image capturing application 116 communicates with the digital image management system 105 to upload digital images, download digital images, analyze digital images, and/or synchronize digital images with a user account on the digital image management system 105.

Although FIG. 1 illustrates a particular arrangement of the environment 100 includes the server(s) 104, the network 102, the digital image recognition system 106, and the user client device 114, various additional or alternative arrangements are possible. For example, while FIG. 1 illustrates the digital image database 110 and the editing data repository 112 as separate from the digital image recognition system 106, in some embodiments the digital image recognition system 106 includes the digital image database 110 and the editing data repository 112. Alternatively, in at least one embodiment, the machine learning model 108, the digital image database 110, and the editing data repository 112 are located outside the server(s) 104 and may communicate with the server(s) 104 via the network 102.

As mentioned above, in one or more embodiments, the digital image recognition system 106 analyzes a digital image captured by a user client device (e.g., user client device 114) to detect objects within the digital image and identify a scene category corresponding to the detected objects. For instance, FIG. 2 illustrates a representation of the user client device 114 including a digital image 200 wherein the digital image recognition system 106 identifies various objects 202-210.

Figure 2:
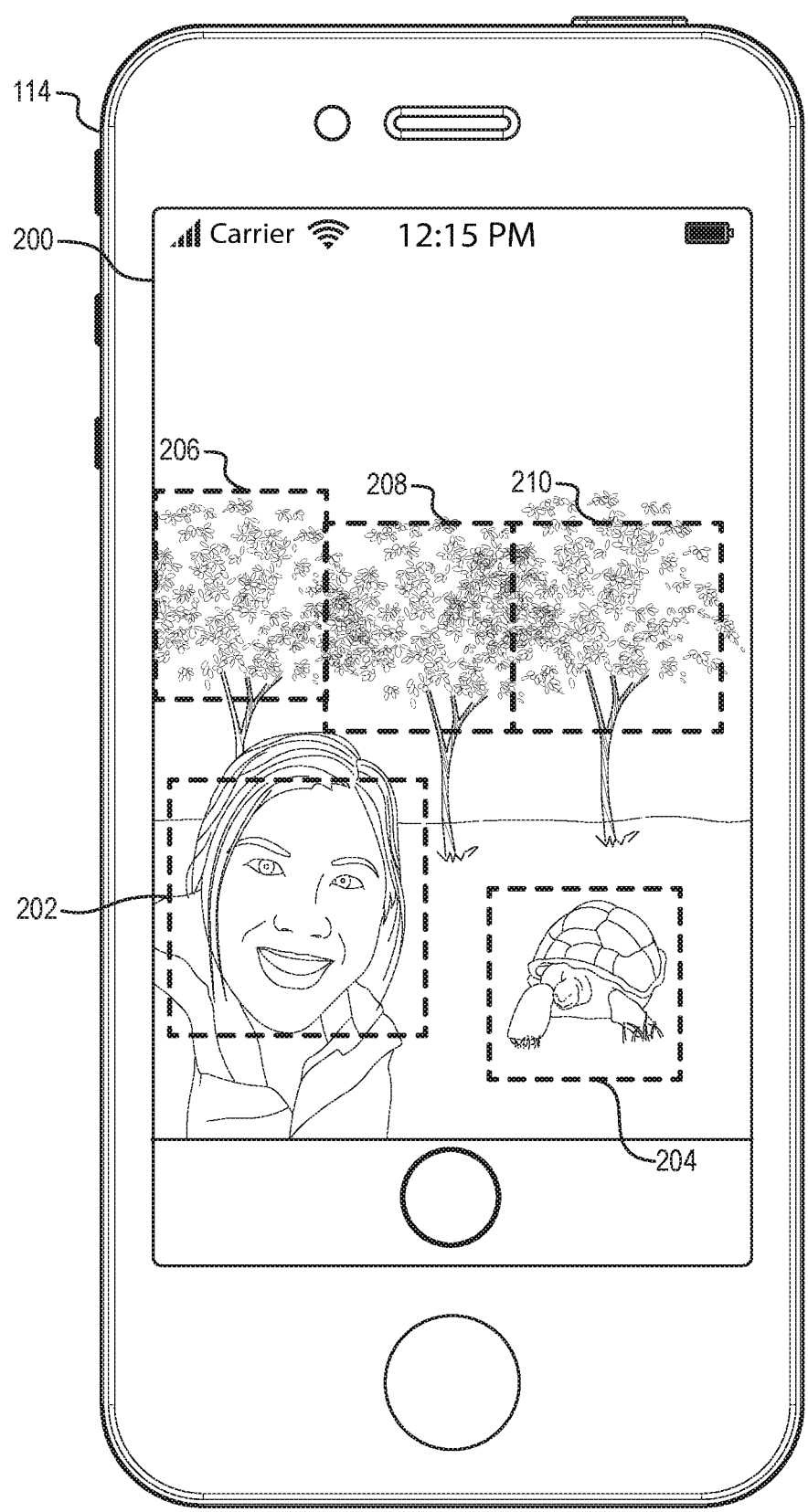
FIG. 2 illustrates an example user client device displaying an example digital image in accordance with one or more embodiments.

As illustrated in FIG. 2, the digital image recognition system 106 analyzes the digital image 200 to identify the objects 202-210. In particular, the digital image recognition system 106 may utilize a machine learning model (machine learning model 108) to analyze the digital image 200. For instance, in these embodiments the digital image recognition system 106 trains a machine learning model to identify objects within digital images based on training images from the digital image database 110. In particular, the digital image recognition system 106 trains the machine learning model to output probabilities that object tags associate with a digital image based on potential objects detected within the digital image. Indeed, the digital image recognition system 106 may implement a single machine learning model (e.g., machine learning model 108) to analyze the digital image 200 to identify the objects 202-210 and to determine probabilities of object tags that corresponding with the objects 202-210. Additional detail regarding utilizing and training a machine learning model is provided below with reference to FIGS. 3-4.

In further embodiments, the digital image recognition system 106 analyzes the digital image 200 by way of one or more object recognition algorithms. In particular, the digital image recognition system 106 may implement a feature-based object recognition algorithm or an appearance-based object recognition algorithm. For example, the digital image recognition system 106 may implement one or more of an edge matching technique, a greyscale matching technique, a gradient matching technique, an interpretation tree, pose clustering, geometric hashing, a scale-invariant feature transform ("SIFT"), and/or a speeded up robust features ("SURF") technique.

Regardless of the image analysis technique, the digital image recognition system 106 identifies the objects 202-210. In particular, the digital image recognition system 106 identifies a face object 202, a tortoise object 204, and three tree objects 206-210 (though the digital image recognition system 106 may not initially identify them as a face, tortoise, and trees, respectively). As described in further detail hereafter, the digital image recognition system 106 determines based on the analysis of the digital image a probability that each of a plurality of object tags is associated with the digital image. Based on the object tag probabilities, the digital image recognition system 106 further determines probabilities that the digital image 200 belongs to each of a plurality of scene categories. Using the scene category probabilities, the digital image recognition system 106 then classifies the digital image 200 into a scene category or scene categories, as explained in more detail below.

Figure 3:
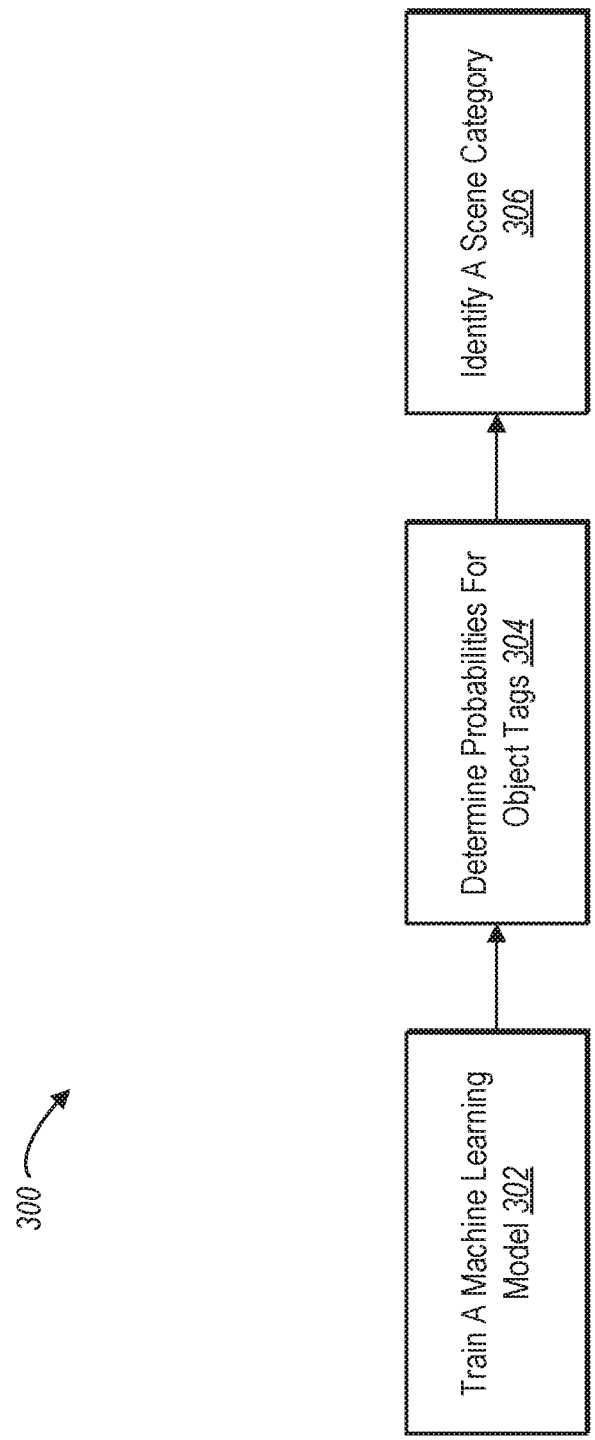
FIG. 3 illustrates an example flow of acts whereby the digital image recognition system identifies a scene category for a digital image in accordance with one or more embodiments.

FIG. 3 illustrates a flow 300 including acts 302-306. In particular, FIG. 3 illustrates an overview of how the digital image recognition system 106 analyzes a digital image to classify the digital image into one or more scene categories. A brief description of the acts 302-306 is provided with respect to FIG. 3. Thereafter, a more detailed discussion of particular techniques and methods is provided in relation to subsequent figures.

As shown, the flow 300 includes an act 302 that illustrates that the digital image recognition system 106 trains a machine learning model (e.g., the machine learning model 108). As mentioned, the process of training a machine learning model is described in greater detail below with reference to FIG. 4. To briefly illustrate, the digital image recognition system 106 trains a machine learning model based on a set of training data (e.g., training images) to generate probabilities of object tags matching a digital image. Indeed, act 304 illustrates that the digital image recognition system 106 implements the trained machine learning model to analyze the digital image to determine probabilities of object tags matching the digital image.

As just mentioned, the flow 300 includes an act 304 depicting that the digital image recognition system 106 determines probabilities for object tags. In particular, the digital image recognition system 106 determines, for each of a set of object tags, a probability that the object tag associates with the digital image. To determine a probability that a given object tag associates with the digital image, the digital image recognition system 106 implements a trained machine learning model. By implementing the trained machine learning model, the digital image recognition system 106 identifies objects within the digital image and determines probabilities that object tags match those objects identified in the digital image.

More specifically, the digital image recognition system 106 defines a set of object tags for objects within the digital image database 110. In particular, the digital image recognition system 106 accesses the digital image database 110 of digital images and corresponding object tags. In some embodiments, the digital image database 110 comprises a training dataset of digital images with corresponding object tags for use by the digital image recognition system 106 to, for example, train a machine learning model to analyze digital images and determine which object tags correspond to the digital images. The defined set of object tags (containing N objects tags in total) may be expressed as:

$$T=\{t_1,t_2,t_3,\ldots,t_i,\ldots,t_N\}$$

where $t_i$ represents the $i^{th}$ object tag within the set of object tags T.

Indeed, in some embodiments the digital image recognition system 106 collects information from users such as user 118 (and others). In particular, the digital image recognition system 106 gathers information such as object tags that the users use to label and identify various objects within digital images (e.g., digital images stored in the digital image database 110). To illustrate by an example, if the digital image 200 was an image stored in the digital image database 110, user 118 may identify and tag the objects within the digital image 200. For instance, the user 118 may tag object 202 as "Me" or "face" or "Chelsea Miller" or "@therealC-Mills." Similarly, the user 118 may tag object 204 as "tortoise" or "animal," and the user 118 may tag the objects 206-210 each as "tree." From the different object tags that users apply (or have previously applied) to various objects/images in the digital image database 110, the digital image recognition system 106 identifies the set of object tags T, as defined above.

Figure 5:
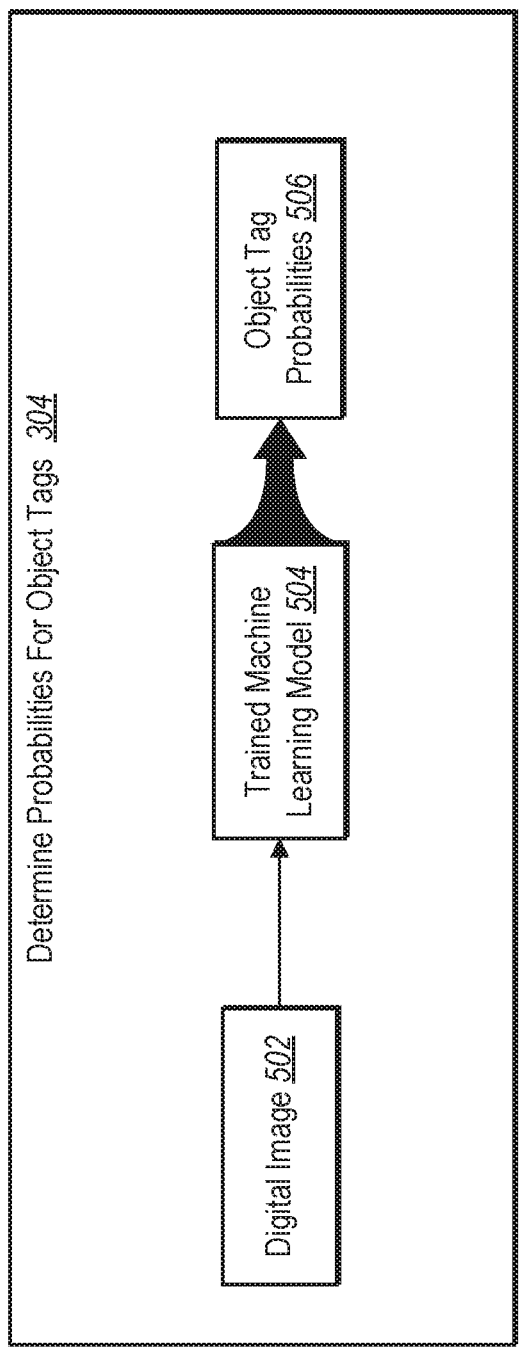
FIG. 5 illustrates an example flow of training a machine learning model in accordance with one or more embodiments.

As mentioned, and as will be described in further detail below with reference to FIG. 5, the digital image recognition system 106 calculates the probability of matching the digital image for each of the object tags within the set T defined above. To illustrate and as shown in FIG. 2, based on identifying the objects 202-210 within the digital image 200, the digital image recognition system 106 determines probabilities for object tags within the set T matching one or more of the objects 202-210. Thus, the digital image recognition system 106 can determine a probability that a given object tag matches the digital image 200. Additional detail regarding determining the probability that a given object tag associates with or matches the digital image 200 is provided below with reference to FIG. 5.

To determine the probabilities for the object tags, the digital image recognition system 106 uses a trained machine learning model to determine a separate probability for each object tag of the pre-defined set of object tags T. Each probability represents a likelihood that the corresponding object tag associates with (e.g., applies to or matches) the digital image or an object within the digital image. Using those object tags, the digital image recognition system 106 determines a probability for each tag that the given object tag associates with (e.g., matches) the digital image. The probability of each object tag may be represented as:

$$P^t = \{p_1^t, p_2^t, p_3^t, \ldots, p_i^t, \ldots, p_N^t\}$$

where, where $p_i^t$ is the probability that the $i^{th}$ object tag associates with the digital image.

As further illustrated in FIG. 3, the flow 300 includes an act 306 to identify a scene category. More specifically, the digital image recognition system 106 identifies a scene category that matches the digital image from among a set of scene categories. As described in further detail below with reference to FIG. 6, the digital image recognition system 106 identifies a scene category by determining similarities between a known set of object tags and a known set of scene categories. The digital image recognition system 106 further determines probabilities for each of the known scene categories matching the digital image. Then, based on the determined similarities between object tags and scene categories, and further based on the determined probabilities associated with the scene categories, the digital image recognition system 106 can identify a scene category to which the digital image belongs.

As an initial matter, the digital image recognition system 106 identifies a set of possible scene categories to which a digital image (e.g., digital image 200) can be matched. In particular, the digital image recognition system 106 may identify a set of scene categories from the digital image database 110. For instance, users such as user 118 may define scene categories for digital images stored within the digital image database 110. In the same or other embodiments, the digital image recognition system 106 includes a predefined set of scene categories. In either case, the digital image recognition system 106 can adapt to learn new scene categories (and new object tags), as will be described in further detail below in relation to subsequent figures. The set of scene categories (with M total scene categories) can be represented as:

$$S = \{s_1, s_2, s_3, \ldots, s_j, \ldots, s_M\}$$

where $s_j$ is the $j^{th}$ scene category within the set S.

The digital image recognition system 106 identifies the scene category to which the digital image 200 belongs by utilizing word to vector (e.g., Word2vec) algorithms to generate a feature vector for each object tag within the set T described above, as well as a feature vector for each scene category within the set S, also described above. As mentioned, the digital image recognition system 106 further determines a similarity between each object tag feature vector and each scene category feature vector. Utilizing the similarities between the feature vectors, the digital image recognition system 106 further determines probabilities that the digital image 200 belongs to or matches each of the scene categories within the set S. In addition, the digital image recognition system 106 classifies the digital image 200 into a designated scene category based on the calculated probabilities. Additional detail regarding identifying the scene category for the digital image 200 is provided below in relation to FIG. 6.

Figure 4:
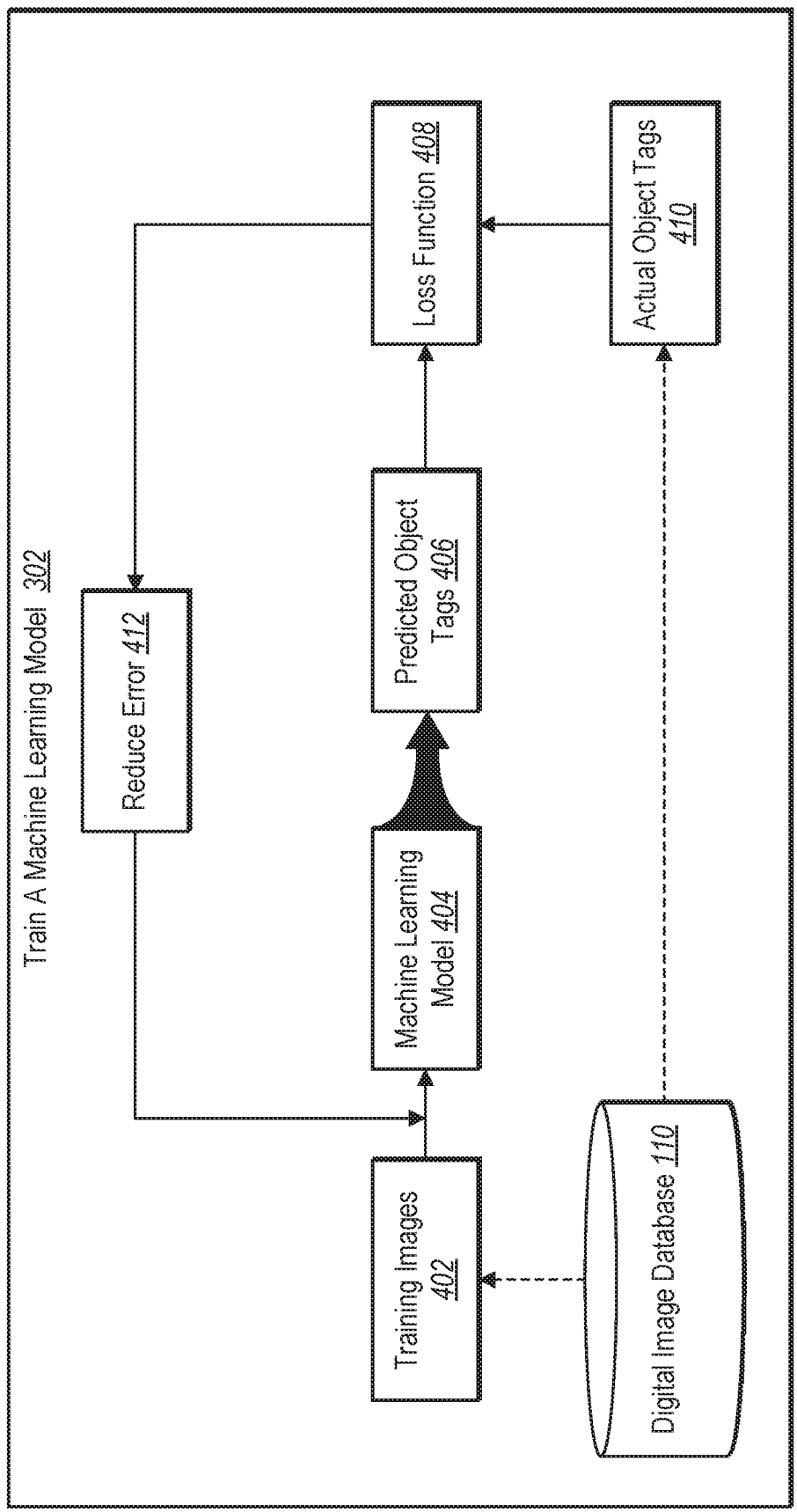
FIG. 4 illustrates an example flow of determining probabilities for various object tags in relation to a digital image in accordance with one or more embodiments.

As mentioned above in relation to act 302 of FIG. 3, the digital image recognition system 106 trains a machine learning model. To illustrate the training of a machine learning model (e.g., machine learning model 108), FIG. 4 depicts the act 302 in greater detail, including separate acts and/or components involved in training a machine learning model 404. The machine learning model 404 may be the same trained machine learning model 108 from FIG. 1. From FIG. 4, the digital image recognition system 106 identifies one or more training images 402 from the digital image database 110. Additionally, the digital image recognition system 106 trains the machine learning model 404 using actual object tags 410 from the digital image database 110.

To elaborate, the digital image recognition system 106 applies the machine learning model 404 to an input set of training images 402. In some embodiments, the machine learning model 404 analyzes one training image at a time and generates a set of predicted object tags 406 that correspond to the training image. The digital image recognition system 106 compares the predicted object tags 406 with actual object tags 410 that correspond to the training image. The actual object tags 410 are user-defined tags applied to objects within digital images stored in the digital image database 110.

To compare the predicted object tags 406 with the actual object tags 410 associated with a given training image, the digital image recognition system 106 applies a loss function 408 to the predicted object tags 406 and/or the actual object tags 410. By applying the loss function 408, the digital image recognition system 106 determines a measure of loss (e.g., a difference or measure of error) between the actual object tags 410 of the training image and the predicted object tags 406 of the training image. For example, the digital image recognition system 106 may apply any of a number of appropriate loss functions such as a Bayesian loss function, a risk function, a quadratic loss function, or a utility loss function.

As shown, the digital image recognition system 106 can train the machine learning model 404 based on the determined loss (or error) between the actual object tags 410 and the predicted object tags 406. In particular, the digital image recognition system 106 trains the machine learning model 404 by performing the act 412 of reducing the error generated by the loss function 408. For instance, the digital image recognition system 106 can modify parameters of the machine learning model 404 to reduce the difference between the predicted object tags 406 and the actual object tags 410. To illustrate, in one or more embodiments the digital image recognition system 106 performs one of a number of error reduction techniques such as mean squared error reduction or standard error reduction.

Furthermore, in some embodiments, the digital image recognition system 106 repeats the process illustrated by flow 400. Indeed, the digital image recognition system 106 can identify a second training image from the digital image database 110, generate a second set of predicted object tags, compare the second set of predicted object tags with the corresponding actual object tags by applying a loss function, and reduce the error between the second set of predicted object tags and actual object tags. Indeed, the digital image recognition system 106 can repeatedly train the machine learning model 404 utilizing a plurality of different training images 402. As the digital image recognition system 106 repeats the process of act 302, the predicted object tags 406 become more and more accurate—i.e., closer to the actual object tags 410.

Because the digital image recognition system 106 utilizes a machine learning model 404, the digital image recognition system 106 is more adaptive than conventional systems. To illustrate, the digital image recognition system 106 can retrain the machine learning model 404 using a new or updated set of training images within the digital image database 110. For example, the digital image recognition system 106 can learn new objects and corresponding object tags by retraining the machine learning model 404 using training images that have new objects with corresponding object tags.

As mentioned above in relation to FIG. 3, the digital image recognition system 106 performs act 304 to determine probabilities for object tags. Indeed, FIG. 5 illustrates act 304 in greater detail than illustrated and described above in relation to FIG. 3. In particular, the digital image recognition system 106 can perform act 304 to determine a probability for each object tag of associating with a digital image (e.g., digital image 200). As illustrated in FIG. 5, the act 304 includes additional acts and/or components therein that make up the process or functionality of determining the probability that a given object tag matches a particular digital image.

In particular, the digital image recognition system 106 implements a trained machine learning model 504 to predict object tags that match the digital image 502. The trained machine learning model 504 may be the same as machine learning model 108 and/or machine learning model 404. Likewise, the digital image 502 may be the same as digital image 200, or may be a different image. In applying the trained machine learning model 504 to the digital image 502, the digital image recognition system 106 determines probabilities of object tags associating with the digital image 502.

Indeed, the digital image recognition system 106 may implement the trained machine learning model 504 to identify objects within the digital image 502 and, based on the identified objects, to generate object tag probabilities 506. In particular, the digital image recognition system 106 uses the trained machine learning model 504 to calculate a probability that a given object tag accurately describes one or more of the objects identified within the digital image 502. More specifically, the digital image recognition system 106 determines the probability $P^t$ described above. The probability $P^t$ may be a result (e.g., an output) of implementing the trained machine learning model 504. For instance, the probability $P^t$ may be the same as the object tag probabilities 506 illustrated in FIG. 5.

To determine whether a given object tag associates with the digital image 502, the digital image recognition system 106 compares the determined probabilities of each object tag with a threshold probability. For example, the digital image recognition system 106 determines that those object tags within $P^t$ that meet or exceed a probability threshold (e.g., a 40% match probability or an 80% match probability or any other feasible threshold) are object tags that match (e.g., are associated with) the digital image 502.

Figure 6:
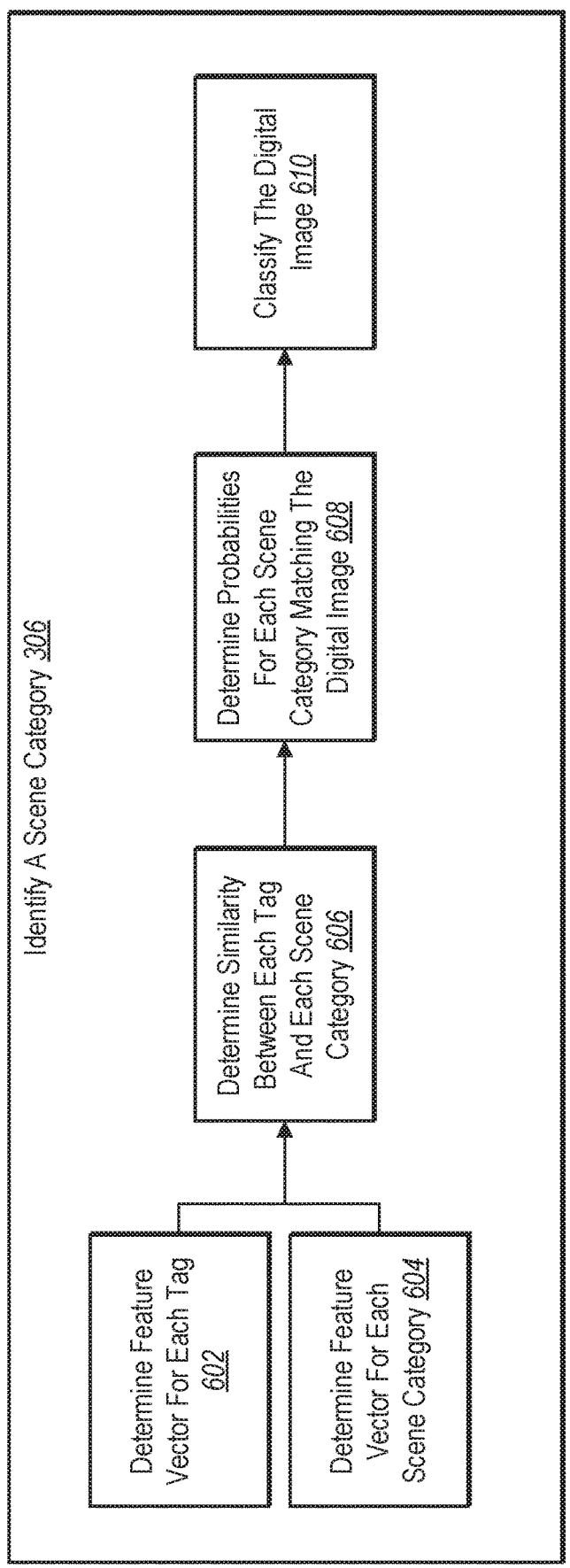
FIG. 6 illustrates an example flow of identifying a scene category for a digital image in accordance with one or more embodiments.

As mentioned above, the digital image recognition system 106 performs act 306 to identify a scene category. In particular, the digital image recognition system 106 identifies one or more scene categories to which a digital image (e.g., digital image 200 or 502) belongs. More specifically, as illustrated in FIG. 6, the act 306 can include additional acts 602-610 therein that are involved in identifying the scene category for the digital image. Indeed, FIG. 6 illustrates a step for identifying a designated scene category for the digital image. The step for identifying a designated scene category for the digital image can include the below description of FIG. 6 in addition to relevant methods and techniques described elsewhere in this disclosure, including but not limited to, the equations and formulas described in relation to FIG. 3.

For example, identifying the scene category can additionally include an act 602 to determine a feature vector for each object tag within the set T. To illustrate, the digital image recognition system 106 determines a feature vector by implementing a feature vector algorithm such as a word to vector algorithm. To determine a feature vector that represents an object tag, the digital image recognition system 106 may utilize a Word2Vec model. Generally, Word2Vec models are shallow, two-layer neural networks that are trained to reconstruct linguistic contexts of words. Accordingly, the digital image recognition system 106 applies a Word2Vec model to each object tag to generate a corresponding object tag feature vector (e.g., Word2Vec vector). A given (e.g., the $i^{th}$ in a set of object tag feature vectors) object tag feature vector can be represented as:

$$v_i^t$$

Additionally, the digital image recognition system 106 determines a feature vector for each scene category within the set S. To generate or determine a scene category feature vector, the digital image recognition system 106 also utilizes a Word2Vec model. In particular, the digital image recognition system 106 may use the same Word2Vec model or a different Word2Vec model to generate a scene category feature vector as the digital image recognition system 106 uses to generate an object tag feature vector.

In other embodiments, the digital image recognition system 106 may implement a different type of feature vector algorithm to generate the object tag feature vectors and the scene category feature vectors. Regardless of the algorithm by which the digital image recognition system 106 generates the feature vectors, however, a given scene category feature vector (e.g., the $j^{th}$ scene category feature vector in a set of scene category feature vectors) can be represented as:

$$v_j^s.$$

Considering both the object tag feature vectors and the scene category feature vectors, the digital image recognition system 106 performs act 606 to determine a similarity (e.g., a similarity score) between each object tag and each scene category. In particular, the digital image recognition system 106 generates pairs or pairings that each include one object tag and one scene category. The digital image recognition system 106 may generate a plurality of pairs equal to the number of scene categories or may generate a plurality of pairs equal to the number of object tags (or some other number). In any event, the digital image recognition system 106 pairs each object tag with each scene category.

The digital image recognition system 106 calculates the similarity for each pair of a given object tag $t_i$ and a given scene category $s_j$ by:

$$\text{prob}_{ij}(s_j, t_i) = \frac{v_j^s v_i^t}{\|v_j^s\|_2^2 \|v_i^t\|_2^2}$$

where $\text{prob}_{ij}(s_j, t_i)$ represents a similarity score between the $i^{th}$ object tag and the $j^{th}$ scene category.

By determining the similarity between each object tag and each scene category, the digital image recognition system 106 generates a measure by which the digital image recognition system 106 can categorize a digital image. In particular, the digital image recognition system 106 can utilize the similarity scores for each pairing of object tag and scene category to further determine a likelihood or probability that those object tags that are associated with a given digital image (as described above) also match a scene category.

To illustrate, as further illustrated by FIG. 6, the digital image recognition system 106 performs an act 608 to determine probabilities for each scene category matching the digital image. In particular, the digital image recognition system 106 determines, for each scene category, a probability that the digital image belongs to the scene category. In other words, the digital image recognition system 106 calculates a number of probabilities with respect to the digital image, one for each possible scene category. For example, the digital image recognition system 106 can determine the probability for a given digital image with a given object tag matching a particular scene category as:

$$p_j^s = \text{prob}_{ij}(s_j, t_i) * p_i^t$$

where $p_j^s$ represents the probability of the $j^{th}$ scene category matching the digital image including the object tag $t_i$, $p_i^t$ represents the probability of the $i^{th}$ object tag matching the digital image (as described above), and $\text{prob}_{ij}(s_j, t_i)$ is defined above in relation to act 606.

Accordingly, the digital image recognition system 106 can potentially determine the probability for a given scene category, $p_j^s$, with respect to each object tag. Indeed, the digital image recognition system 106 determines a scene category probability based on a given image associating with a given object tag $t_i$. Thus, the digital image recognition system 106 may calculate a different scene category probability for each possible combination of similarity scores (e.g., $\text{prob}_{ij}(s_j, t_i)$) and object tag probabilities (e.g., $p_i^t$). Accordingly, the digital image recognition system 106 may calculate a number of scene category probabilities, $p_1^s, \ldots, p_j^s, \ldots, p_M^s$.

In addition, the digital image recognition system 106 can apply a probability threshold for the determined scene category probabilities. For example, in some embodiments, the digital image recognition system 106 can select the scene category associated with the highest scene category probability as the designated scene category for the digital image. In other embodiments, the digital image recognition system 106 can identify more than one scene category as designated scene categories. For example, the digital image recognition system 106 can determine that two or more scene categories have probability scores that exceed a given probability threshold (e.g., 50%, 60%, 70%, etc.) and that, therefore, each of these scene categories are designated as scene categories to which the digital image belongs.

The digital image recognition system 106 can alternatively determine the probability for a given digital image matching a particular scene category as:

$$p_j^s = \frac{1}{N} \sum_{i=1}^{N} \text{prob}_{ij}(s_j, t_i) * p_i^t$$

where $p_j^s$ represents the probability of the $j^{th}$ scene category matching the digital image, N represents the number of object tags in the set described above, $p_i^t$ represents the probability of the $i^{th}$ object tag matching the digital image (as described above in relation to FIG. 3), and $\text{prob}_{ij}(s_j, t_i)$ is defined above in relation to act 606. In these embodiments, the digital image recognition system 106 averages a probability over each of the object tags within the set of object tags as defined above.

Although not illustrated in FIG. 6, the act 608 may further involve determining various factors associated with the objects within the digital image. In particular, the digital image recognition system 106 can determine a prominence score associated with each object within the digital image. The digital image recognition system 106 can determine a prominence score of an object by determining a size of the object within a frame (e.g., a camera frame or a display). Indeed, objects that are closer to the camera appear larger in the frame and may therefore be more prominent (e.g., more central or focal to the overall scene of the digital image). Thus, the digital image recognition system 106 may determine that objects that are closer (larger) have a higher prominence score than objects that are farther away (smaller). To illustrate, the digital image recognition system 106 may determine that object 202 within the digital image 200 of FIG. 2 has a higher prominence score than the objects 204-210, and may therefore designate the digital image 200 as a selfie (instead of an animal/wildlife picture or a forest scene, for example).

In addition, the digital image recognition system 106 can determine a prominence score based on a position of an object. For example, an object that is more centrally located within a frame may be more important to the overall scene than objects that are more peripheral. To illustrate, considering only the position of the objects 202-210 within the digital image 200 of FIG. 2, the digital image recognition system 106 may determine that the digital image 200 is a forest scene because object 208 is most centrally located within the frame.

Additionally or alternatively, the digital image recognition system 106 can determine a prominence score associated with a number of objects that have the same or similar object tags within the digital image. In particular, the digital image recognition system 106 can calculate a number of objects within a digital image that have the same object tag. Accordingly, the digital image recognition system 106 designates those objects that are more abundant as more prominent than other objects that are fewer in number. By way of example from FIG. 2, the digital image recognition system 106 may determine that the digital image 200 is a forest scene because the digital image recognition system 106 may determine that there are three objects (e.g., objects 206, 208, and 210) that are trees (e.g., that have the object tag "tree"), while there is only one face object 202 and one animal object 204.

In the same or other embodiments, the digital image recognition system 106 considers contextual information in determining the probability that a digital image belongs to a given scene category. In particular, the digital image recognition system 106 can access different application programming interfaces ("APIs") to identify various contextual information. For example, the digital image recognition system 106 can access a weather API to identify weather information. Additionally, the digital image recognition system 106 can access location information by way of a global positioning system ("GPS") device or other locator associated with a user client device (e.g., user client device 114). Accordingly, the digital image recognition system 106 can consider location information and/or weather information to determine the probability that a digital image belongs to a given scene category.

To illustrate, the digital image recognition system 106 can apply a weight to the prominence score and/or probability of an object or object tag based on the geographic location of the digital image. For a digital image taken in a popular restaurant, for example, the digital image recognition system 106 may weight food objects more heavily than other objects because it is more likely that a user (e.g., user 118) would take a food picture than a selfie or a digital image of another scene category at that particular location.

Likewise, the digital image recognition system 106 can apply a weight to a digital object based on other contextual information such as weather information, time of day information, or other information. For example, on a night that is clear of clouds at the location of the user client device 114, the digital image recognition system 106 may determine that a digital image that includes a number of stars is more likely a starry sky scene than a digital image of another scene category.

Additionally, the digital image recognition system 106 can train a machine learning model based on contextual information associated with training images from the digital image database 110. Indeed, the digital image recognition system 106 can train the machine learning model using metadata that indicates the locations of each training image within the digital image database 110. Based on the locations of the training images, and further based on the actual scene categories associated with the training images, the digital image recognition system 106 can train the machine learning model to identify scene categories for a new digital image. As an example, the digital image recognition system 106 may determine that digital images taken in particular restaurant are predominantly food scenes, and that, therefore, a new digital image captured at the same location is likely also a food picture.

In some embodiments, the digital image recognition system 106 considers multiple factors to determine the probability that a digital image belongs to a given scene category. Indeed, the digital image recognition system 106 can based the determination on size, position, number of objects, and/or contextual information in addition to other factors described herein.

As further illustrated in FIG. 6, the digital image recognition system 106 performs act 610 to classify the digital image into a designated scene category (or more than one scene category). In particular, in some embodiments the digital image recognition system 106 identifies the scene category with the highest probability as the designated scene category. In other embodiments, the digital image recognition system 106 utilizes a different classification technique such as identifying a scene category whose probability score is above a probability threshold. Regardless of which technique, the digital image recognition system 106 classifies the digital image into one or more scene categories based on the analyses described herein.

Figure 7:
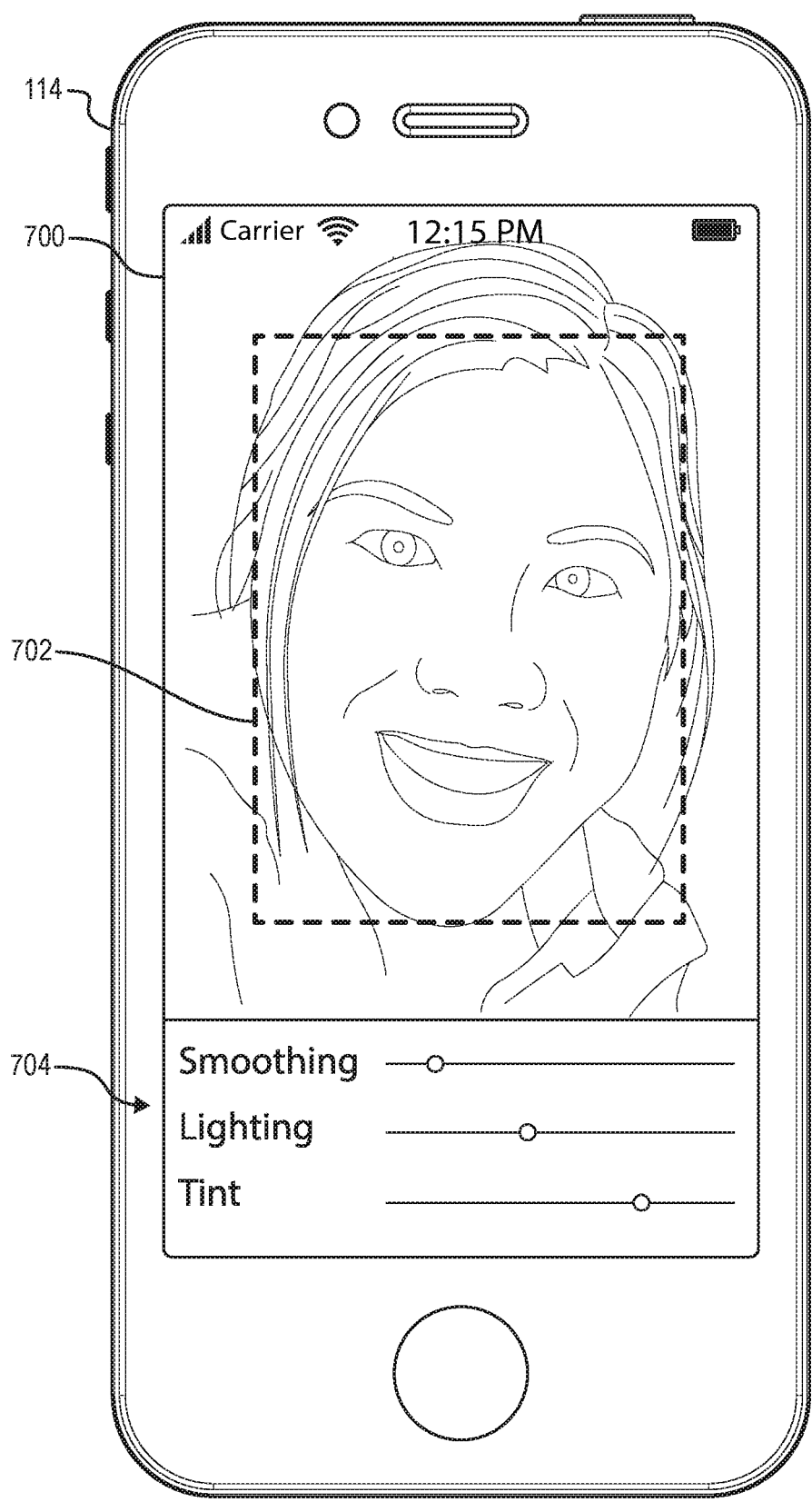
FIG. 7 illustrates an example user client device displaying example image editing tools in accordance with one or more embodiments.

The digital image recognition system 106 further utilizes the designated scene category to provide optimized image editing tools to a user by way of a user device. Indeed, FIG. 7 illustrates the user client device 114 including a digital image 700, an object 702, and image editing tools 704. As used herein "image editing tools" (or "editing tools" or sometimes simply "tools") refer to digital tools or techniques by which a user can edit, alter, manipulate, or otherwise interact with a digital image. For example, image editing tools can include a smoothing tool to adjust smoothing of a digital image, a lighting tool, a tint tool, a greyscale tool, a brightness tool, a contrast tool, a hue tool, a saturation tool, an opacity tool, an overlay tool (for overlaying an icon or image on a digital image), etc.

As mentioned, the digital image recognition system 106 can provide a set of optimized image editing tools 704 within a GUI associated with the user client device 114. In particular, the digital image recognition system 106 provides the image editing tools 704 based on the designated scene category associated with the digital image 700. For instance, the digital image recognition system 106 may classify the digital image 700 as a selfie, in accordance with the disclosure herein.

Based on the classification of the digital image 700, the digital image recognition system 106 further determines a set of image editing tools 704 that correspond to the designated scene category, and provide the image editing tools 704 to the user client device 114. To determine or generate the set of image editing tools 704, the digital image recognition system 106 may predefine a particular set of image editing tools for each scene category within the set S defined above.

In other embodiments, the digital image recognition system 106 may implement a machine learning model to generate the set of image editing tools 704. To illustrate, the digital image recognition system 106 may train a machine learning model based on training editing data. For example, the digital image recognition system 106 may access the editing data repository 112 to identify editing tools that previous users have historically applied to images of various scene categories. Based on training the machine learning model in this way, the digital image recognition system 106 can predict the image editing tools 704 that correspond to the digital image 700.

Indeed, FIG. 7 illustrates the digital image 700 as a selfie. The machine learning model may be trained to accurately predict the set of image editing tools 704 based on training editing data that indicates that users who take selfies most often (or at least more often) adjust image characteristics such as smoothing, lighting, and tint. Similarly, the digital image recognition system 106 may identify alternative image editing tools that users more often manipulate for images of a different scene category.

As illustrated in FIG. 7, the digital image recognition system 106 may limit the set of image editing tools 704 to three or four tools. Accordingly, the digital image recognition system 106 may identify the three or four editing tools that have the highest probability of matching the scene category associated with the digital image 700.

Figure 8:
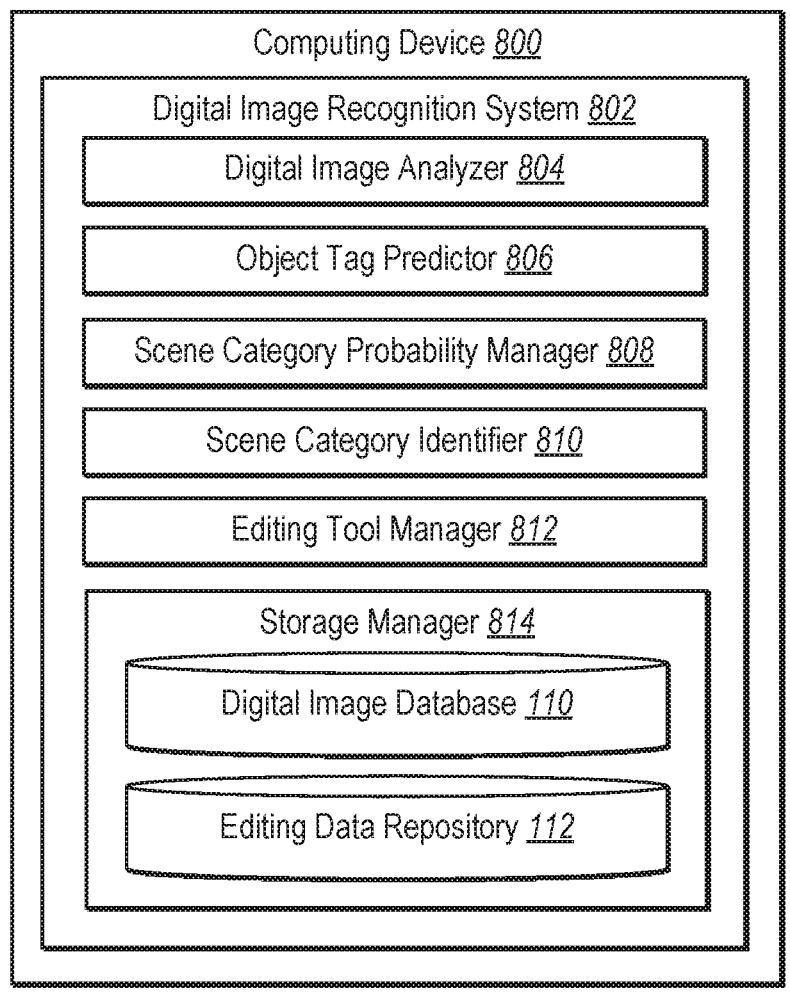
FIG. 8 illustrates an example block diagram of the digital image recognition system in accordance with one or more embodiments.

Looking now to FIG. 8, additional detail will be provided regarding components and capabilities of a digital image recognition system 802. The digital image recognition system 802 of FIG. 8 may be the same as the digital image recognition system 106 of FIG. 1. Specifically, FIG. 8 illustrates an example schematic diagram of the digital image recognition system 106 on an example computing device 800 (e.g., the server(s) 104 and/or the user client device 114). As shown in FIG. 8, the digital image recognition system 106 may include a digital image analyzer 804, an object tag predictor 806, a scene category probability manager 808, a scene category identifier 810, an editing tool manager 812, and a storage manager 814. While FIG. 8 depicts a particular number of components, in some embodiments, the digital image recognition system 106 may include more or fewer components. In addition, the components may perform additional or alternative tasks than those described hereafter.

As mentioned, the digital image recognition system 802 includes a digital image analyzer 804. In particular, the digital image analyzer 804 may implement, perform, utilize, or apply one or more image analysis and/or object recognition algorithms or techniques to a digital image. For example, the digital image analyzer 804 may analyze a digital image to identify objects within the digital image. To illustrate, the digital image analyzer 804 can train and utilize a machine learning model to identify objects within a digital image. Indeed, the digital image analyzer 804 can communicate with the storage manager 812 to access training images within a digital image database 110 to train the machine learning model to analyze a digital image.

As shown, the digital image recognition system 802 further includes an object tag predictor 806. In particular, the object tag predictor 806 may predict, generate, determine, or identify object tags for objects identified within a digital image. The object tag predictor can further determine a probability of particular object tags matching a digital image. In particular, the object tag predictor 806 may implement a machine learning model to determine probabilities that object tags match or describe objects identified within a digital image, as described above. The object tag predictor 806 can communicate with the storage manager 812 to analyze stored object tags within the digital image database 110 (e.g., by way of a machine learning model).

The digital image recognition system 802 further includes a scene category probability manager 808. In particular, the scene category probability manager 808 can determine, calculate, compute, or otherwise measure a probability associated with a given scene category in relation to a digital image. For instance, the scene category probability manager 808 can determine a probability that a digital image matches or belongs to a given scene category. The scene category probability manager 808 can generate feature vectors (e.g., using Word2Vec models) that correspond to object tags, and can further generate feature vectors that correspond to scene categories. The scene category probability manager 808 can further determine the similarities between object tag feature vectors and scene category feature vectors.

As illustrated in FIG. 8, the digital image recognition system 802 includes a scene category identifier 810. The scene category identifier 810 can identify, assign, categorize, classify, or otherwise associate a digital image with a scene category or vice-versa. In particular, the scene category identifier 810 can identify a scene category with a highest probability score and/or can identify one or more scene categories that exceed a similarity threshold, as described above.

As shown, the digital image recognition system 802 also includes an editing tool manager 812. In particular, the editing tool manager 812 can manage, generate, determine, or identify image editing tools for a digital image. The editing tool manager 812 can further provide a set of image editing tools to a user client device or present (or cause to be presented) the editing tools by way of a display of the user client device. For example, the editing tool manager 812 can communicate with the editing data repository 112 to access editing data to train a machine learning model determine those image editing tools that users most often use in relation to digital images of particular scene categories.

As also illustrated in FIG. 8, the digital image recognition system 802 further includes a storage manager 814. The storage manager 814 includes the digital image database 110 and the editing data repository 112. In particular, the storage manager 814 manages, stores, and accesses digital images, objects, and object tags within the digital image database 110. Similarly, the storage manager 814 manages, stores, and accesses editing data associated with image editing tools that users apply or use to edit digital images.

FIGS. 1-8, the corresponding text, and the examples provide a number of different systems and methods that identify a scene category for a digital image and classify the digital image into the designated scene category. In addition to the foregoing, embodiments can also be described in terms of flowcharts comprising acts in a method for accomplishing a particular result. For example, FIG. 9 illustrates a flowchart of an exemplary series of acts in accordance with one or more embodiments.

Figure 9:
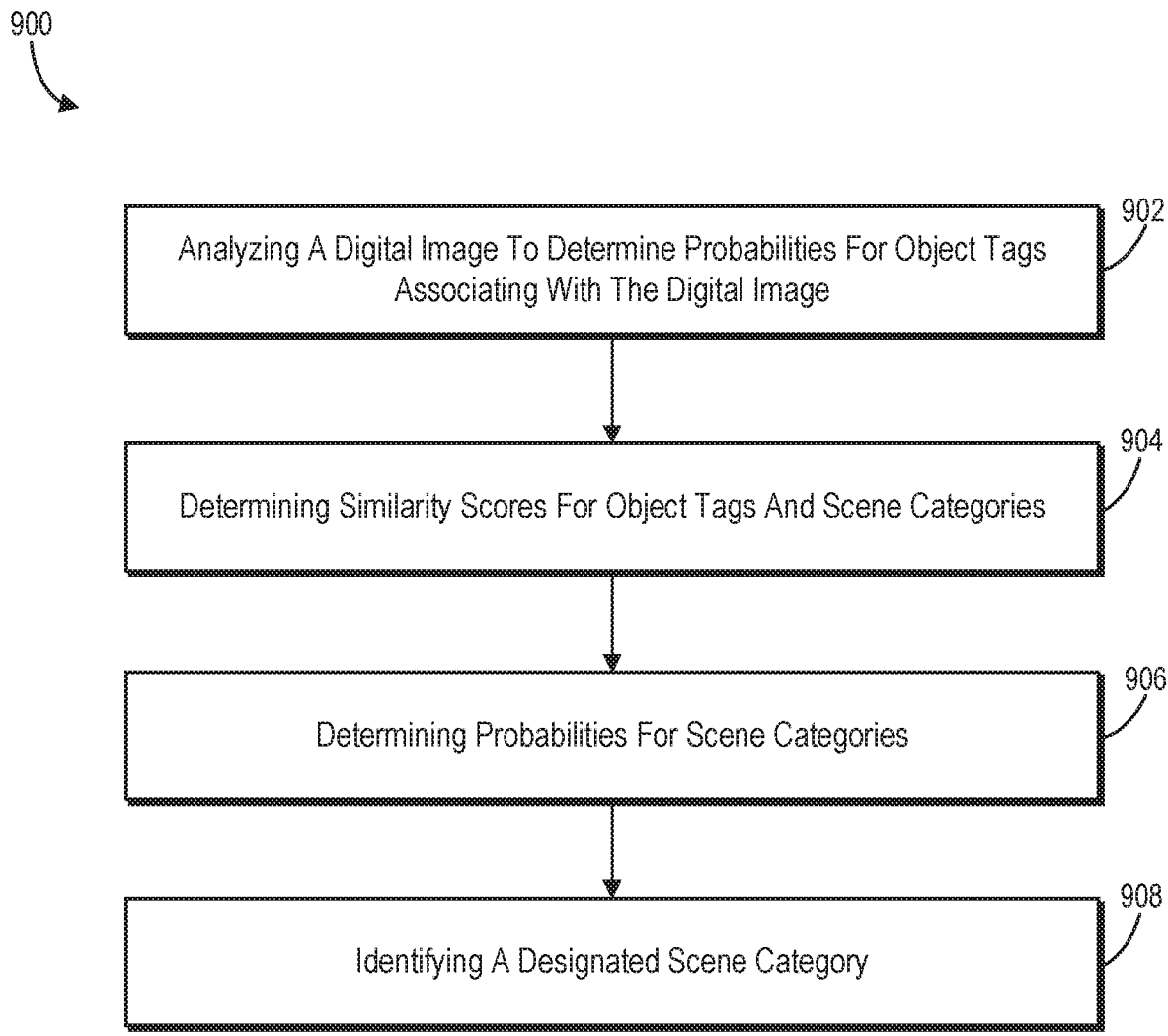
FIG. 9 illustrates a flowchart of a series of acts in a method for identifying a scene category in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the steps/acts described herein may be repeated or performed in parallel with one another or in parallel with different instances of the same or other similar steps/acts.

FIG. 9 illustrates an exemplary series of acts 900 for identifying a scene category for a digital image. In particular, the series of acts 900 includes an act 902 of analyzing a digital image to determine probabilities for object tags associating with the digital image. The act 902 can include analyzing, by at least one processor, a digital image captured by a user client device to determine, for each of a plurality of object tags, a probability that the object tag associates with the digital image. For example, the act 902 may involve implementing a machine learning model to determine, for each of the plurality of object tags, the probability that the object tag associates with the digital image.

The act 902 may also include accessing a digital image database to identify the plurality of object tags, wherein each object tag within the plurality of object tags designates one or more objects from images within the digital image database. The act 902 may further include determining, for each of the plurality of object tags, a probability that the object tag matches an object identified within the digital image.

In addition, the act 902 can involve implementing a machine learning model to calculate a probability that the object tag matches an object identified within the digital image, and comparing the probability that the object tag matches an object identified within the digital image with a probability threshold. The series of acts 900 may also include an act of training the machine learning model by accessing the digital image database to provide a set of training images to the machine learning model, generating predicted object tags by way of the machine learning model, comparing the predicted object tags with actual object tags from the digital image database to determine an error between the predicted object tags and the actual object tags, and reducing the error between the predicted object tags and the actual object tags.

As shown, the series of acts 900 further includes an act 904 of determining similarity scores for object tags and scene categories. In particular, the act 904 can include determining, for each of the plurality of object tags, a similarity score for each of a plurality of scene categories. For example, the act 904 can involve generating, for each of the plurality of object tags, an object tag feature vector, generating, for each of the plurality of scene categories, a scene category feature vector, and comparing each object tag feature vector and each scene category feature vector to determine, for each object tag feature vector, a similarity score for each scene category feature vector.

The series of acts 900 also includes an act 906 of determining probabilities for scene categories. In particular, the act 906 can include based on the similarity scores and the determined probabilities that the plurality of object tags associate with the digital image, determining, for each of the plurality of scene categories, a probability that the digital image belongs to the scene category. For example, the act 906 can involve aggregating, for each of the plurality of scene categories, the similarity scores with the determined probabilities that the plurality of object tags associate with the digital image to generate the probability that the digital image belongs to the scene category.

As further illustrated, the series of acts 900 can include an act 908 of identifying a designated scene category. In particular, the act 908 can involve identifying, based on the determined probability for each of the plurality of scene categories, a designated scene category for the digital image. For example, the act 908 can include identifying, based on the determined probabilities for each of the plurality of scene categories, a scene category that has a highest probability as the designated scene category.

Although not illustrated in FIG. 9, the series of acts 900 can also include an act of generating, based on the designated scene category to which the digital image belongs, a set of image editing tools optimized for the designated scene category. The series of acts 900 can further include an act of providing the set of image editing tools for display by way of a graphical user interface of the user client device. Generating the set of image editing tools may include analyzing a digital repository of editing data to determine a relationship between each of the plurality of scene categories and each of a plurality of image editing tools, and determining, based on analyzing the repository of editing data, the set of editing tools from the plurality of image editing tools that match the designated scene category.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
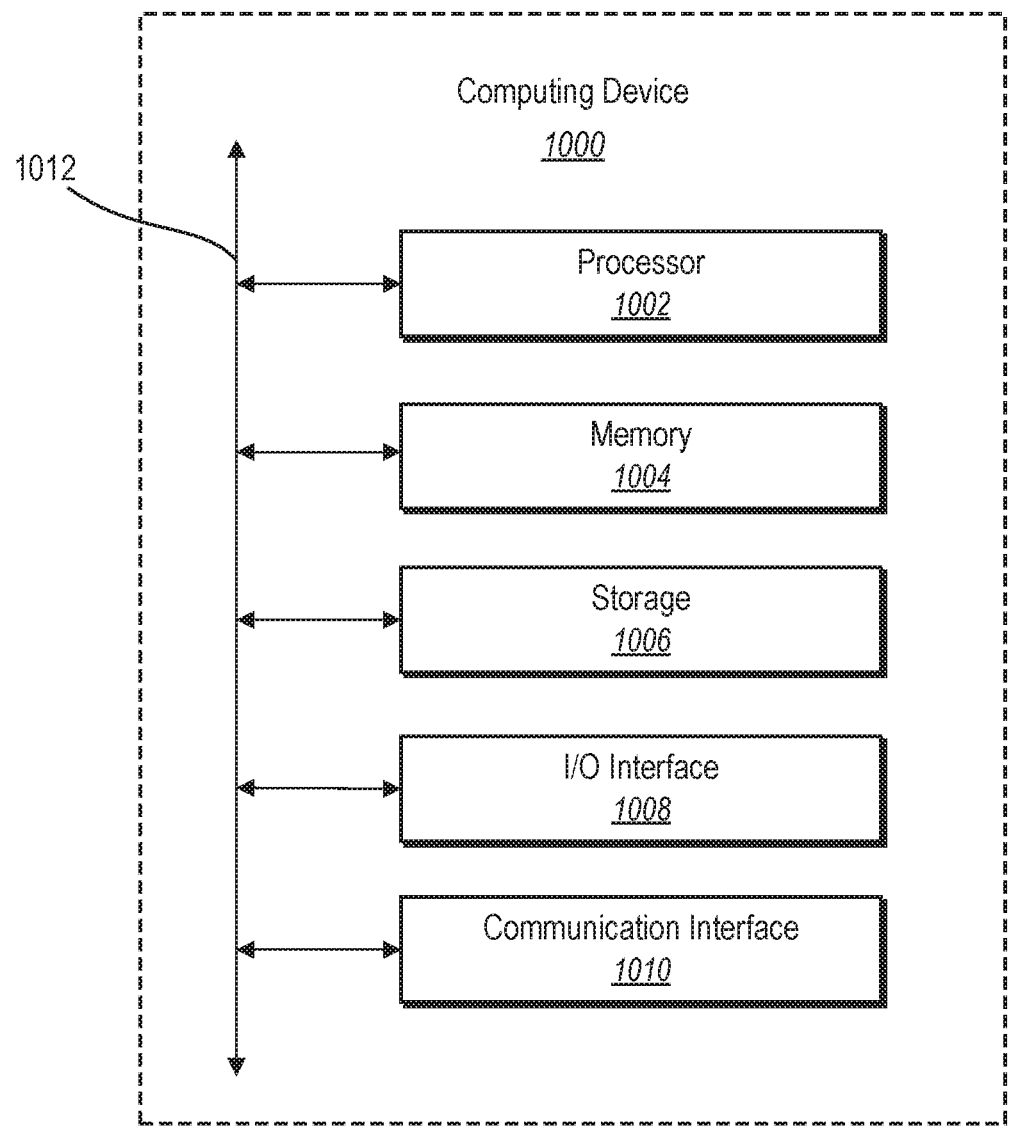
FIG. 10 illustrates a block diagram of an example computing device in accordance with one or more embodiments.

FIG. 10 illustrates, in block diagram form, an exemplary computing device 1000 that may be configured to perform one or more of the processes described above. One will appreciate that the digital image recognition system 106 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for managing digital images, a computer-implemented method of recognizing scenes depicted within digital images, the method comprising:
analyzing, by at least one processor, a digital image captured by a user client device to determine, for each of a plurality of object tags, a probability that the object tag associates with the digital image;
generating an object tag feature vector for each of the plurality of object tags;
generating a scene category feature vector for each of a plurality of scene categories;
utilizing the object tag feature vectors and the scene category feature vectors to determine, for each of the plurality of object tags, a similarity score for each of the plurality of scene categories; and
based on the similarity scores and the probability that each object tag associates with the digital image, determining, for each of the plurality of scene categories, a probability that the digital image belongs to the scene category to identify a designated scene category for the digital image.

2. The computer-implemented method of claim 1, wherein analyzing the digital image comprises implementing a machine learning model to determine, for each of the plurality of object tags, the probability that the object tag associates with the digital image.

3. The computer-implemented method of claim 1, wherein determining the similarity scores comprises comparing object tag feature vectors and scene category feature vectors to determine, for the object tag feature vectors, similarity scores associated with the scene category feature vectors.

4. The computer-implemented method of claim 1, wherein determining the probability that the digital image belongs to the scene category comprises aggregating the similarity scores for each of the plurality of scene categories with the probability that each object tag associates with the digital image.

5. The computer-implemented method of claim 1, wherein determining, for each of the plurality of object tags, the probability that the object tag associates with the digital image comprises:
accessing a digital image database to identify the plurality of object tags, wherein each object tag within the plurality of object tags designates one or more objects from images within the digital image database; and
determining, for an object tag of the plurality of object tags, a probability that the object tag matches an object identified within the digital image.

6. The computer-implemented method of claim 5, wherein determining, for the object tag of the plurality of object tags, the probability that the object tag matches an object identified within the digital image comprises:
implementing a machine learning model to generate the probability that the object tag matches an object identified within the digital image; and
comparing the probability that the object tag matches an object identified within the digital image with a probability threshold.

7. The computer-implemented method of claim 6, further comprising training the machine learning model by:
accessing the digital image database to provide a set of training images to the machine learning model;
identifying predicted object tags by way of the machine learning model;
comparing the predicted object tags with actual object tags from the digital image database to determine an error between the predicted object tags and the actual object tags; and
reducing the error between the predicted object tags and the actual object tags.

8. The computer-implemented method of claim 1, wherein identifying the designated scene category for the digital image comprises identifying a scene category from among the plurality of scene categories that has a highest probability that the digital image belongs the scene category.

9. In a digital medium environment for managing digital images, a system configured to recognize scenes depicted within the digital images, the system comprising:
at least one processor; and
a non-transitory computer readable medium comprising instructions that, when executed by the at least one processor, cause the system to:
analyze a digital image captured by a user client device to determine, for each of a plurality of object tags, a probability that the object tag associates with the digital image;
generate an object tag feature vector for each of the plurality of object tags; and
generate a scene category feature vector for each of a plurality of scene categories;
utilize the object tag feature vectors and the scene category feature vectors to determine, for each of the plurality of object tags, a similarity score for each of the plurality of scene categories; and
based on the similarity scores and the probability that each object tag associates with the digital image, determine, for each of the plurality of scene categories, a probability that the digital image belongs to the scene category to identify a designated scene category for the digital image.

10. The system of claim 9, wherein the instructions cause the system to analyze the digital image by implementing a machine learning model to determine, for each of the plurality of object tags, the probability that the object tag associates with the digital image.

11. The system of claim 9, further comprising instructions that, when executed by the at least one processor, cause the system to compare object tag feature vectors and scene category feature vectors to determine, for the object tag feature vectors, similarity scores associated with the scene category feature vectors.

12. The system of claim 9, wherein the instructions cause the system to:
- generate the object tag feature vectors by generating word2vec vectors for each object tag of the plurality of object tags; and
- generate the scene category feature vectors by generating word2vec vectors for each scene category of the plurality of scene categories.

13. The system of claim 9, wherein the instructions cause the system to determine the similarity score for each of the plurality of scene categories by:
- generating, from the object tag feature vectors and the scene category feature vectors, a plurality of pairings, wherein each of the plurality of pairings comprises one object tag feature vector and one scene category feature vector; and
- determining a similarity score for each of the plurality of pairings.

14. The system of claim 9, wherein the instructions cause the system to determine the probability that the digital image belongs to the scene category by aggregating the similarity scores for each of the plurality of scene categories with the probability that each object tag associates with the digital image.

15. The system of claim 9, wherein the instructions cause the system to determine, for each of the plurality of object tags, the probability that the object tag associates with the digital image by:
- accessing a digital image database to identify the plurality of object tags that each designate an object within the digital image database; and
- determining, for an object tag of the plurality of object tags, a probability that the object tag matches an object identified within the digital image.

16. The system of claim 15, wherein the instructions cause the system to determine, for the object tag of the plurality of object tags, the probability that the object tag matches an object identified within the digital image by:
- implementing a machine learning model to generate the probability that the object tag matches an object identified within the digital image; and
- comparing the probability that the object tag matches an object identified within the digital image with a probability threshold.

17. The system of claim 16, further comprising instructions that, when executed by the at least one processor, cause the system to train the machine learning model by:
- accessing the digital image database to provide a set of training images to the machine learning model;
- generating predicted object tags by way of the machine learning model;
- comparing the predicted object tags with actual object tags from the digital image database to determine an error between the predicted object tags and the actual object tags; and
- reducing the error between the predicted object tags and the actual object tags.

18. The system of claim 9, wherein the instructions cause the system to identify the designated scene category for the digital image by identifying a scene category from among the plurality of scene categories that has a highest probability that the digital image belongs to the scene category.

19. A non-transitory computer readable medium comprising instructions that, when executed by at least one processor, cause a computer device to:
- analyze a digital image captured by a user client device to determine, for each of a plurality of object tags, a probability that the object tag associates with the digital image;
- generate an object tag feature vector for each of the plurality of object tags;
- generate a scene category feature vector for each of a plurality of scene categories;
- utilize the object tag feature vectors and the scene category feature vectors to determine, for each of the plurality of object tags, a similarity score for each of the plurality of scene categories; and
- based on the similarity scores and the probability that each object tag associates with the digital image, determine, for each of the plurality of scene categories, a probability that the digital image belongs to the scene category to identify a designated scene category for the digital image.

20. The non-transitory computer readable medium of claim 19, further comprising instructions that, when executed by the at least one processor, cause the computer device to analyze the digital image by implementing a machine learning model to determine, for each of the plurality of object tags, the probability that the object tag associates with the digital image.

* * * * *